United States Patent Office 3,770,762
Patented Nov. 6, 1973

3,770,762
DIAZEPINE COMPOUNDS AND METHODS FOR THEIR PRODUCTION

Donald E. Butler, Ann Arbor, Mich., assignor to Parke, Davis & Company, Detroit, Mich.
No Drawing. Filed Aug. 29, 1972, Ser. No. 284,756
Int. Cl. C07d 57/02
U.S. Cl. 260—308 R   8 Claims

ABSTRACT OF THE DISCLOSURE

4 - aryl - 1,6-dihydro-1,3,9-trimethylpyrazolo[4,3-f]-s-triazolo[4,3-a][1,4]diazepines; and acid-addition salts. The aryl group is phenyl, o-fluorophenyl, or o-chlorophenyl. The compounds are pharmacological agents, especially anticonvulsant and antianxiety agents. They can be produced by reacting a thio-substituted diazepine (either a thiol or a thioether) with acetohydrazide. The thiols can be produced by reacting a diazepinone with phosphorus pentasulfide. The thioethers can be produced by reacting the thiols with sodium hydride and then with an alkyl halide.

SUMMARY AND DETAILED DESCRIPTION

The present invention relates to new diazepine compounds. More particularly, the invention relates to certain new 4 - aryl - 1,6-dihydro-1,3,9-trimethylpyrazolo [4,3-f] - s - triazolo[4,3-a][1,4]diazepine compounds; to salts thereof; and to methods for the production of the foregoing compounds.

In the forms of their free bases, the compounds of the invention can be represented by the formula

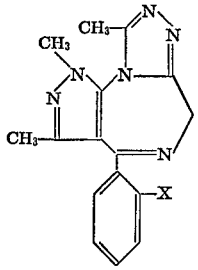

wherein X represents hydrogen, fluorine, or chlorine.

The compounds of the invention can be produced by reacting a thio-substituted diazepine compound of the formula

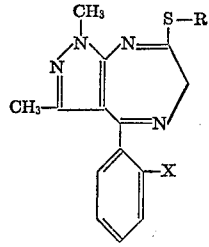

or a salt thereof with acetohydrazide

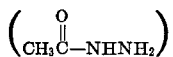

or a salt thereof; where X is as defined before, and R represents hydrogen or lower alkyl, preferably methyl. It is recommended to use the reactants as free bases, especially if moisture is present. A solvent is not necessary and it is preferred not to use one; however, if desired, any of a variety of high-boiling, non-reactive solvents can be used. These include alcohols such as octanol, ethylene glycol, and propylene glycol; ethers such as diphenyl ether, di-ethylene glycol dimethyl ether, and diethylene glycol di-ethyl ether; hydrocarbons such as biphenyl, triethylbenzene, and high-boiling petroleum fractions; and mixtures of these. The reactants are preferably used in approximately equimolar quantities, although an excess of either can be used if desired. The process is carried out by heating the reactants at a relatively high temperature, for example at 150–250° C. for from 30 minutes to 12 hours. The preferred reaction conditions are a temperature of 185–200° C. for from 3 to 5 hours. It is convenient, although not necessary, to carry out the reaction under reduced pressure. This enables the volatile by-products, water and hydrogen sulfide, or an alkanethiol, to be rapidly removed from the reaction vessel. The product is isolated as the free base or as an acid-addition salt following adjustment of the pH as necessary.

The thio-substituted diazepines employed as starting materials in the foregoing process can be obtained by any of a variety of methods. For example, a 4-aryl-6,8-dihydro-1,3 - dimethylpyrazolo[3,4-e][1,4]diazepin - 7(1H)-one (U.S. Pat. 3,558,605) of the formula

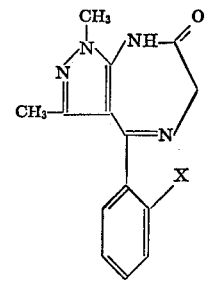

where X is as defined before, is reacted with phosphorus pentasulfide to produce one of the types of thio-substituted diazepine compounds used as starting material in the foregoing process, specifically the thiol, wherein R=hydrogen. The thiols produced in this manner can be reacted with sodium hydride and then with an alkyl halide (such as iodomethane) to produced the thioethers (wherein R =lower alkyl) also used as starting materials in the foregoing process. These procedures are illustrated in greater detail hereinafter.

The free bases of the invention form acid-addition salts with any of a variety of organic and inorganic acids. Pharmaceutically-acceptable acid-addition salts are formed with such acids as hydrochloric, hydrobromic, sulfuric, nitric, phosphoric, acetic, citric, tartaric, succinic, salicyclic, maleic, malic, lactic, gluconic, and pamoic acids. In most cases salts with one equivalent of a mineral acid or a strong organic acid are stable chemical derivatives. The free bases and their salt forms are interconvertible by adjustment of the pH. The free bases are produced by basification and the acid-addition salts are produced by acidification. They differ in solubility properties but, in general, are otherwise equivalent for the purposes of the invention.

The compounds of the invention are new chemical compounds that are useful as pharmacological agents. They exert a depressant effect upon the central nervous system that is shown by their ability to prevent the occurrence of convulsions in animals following the administration of pentamethylenetetrazole and also by their ability to overcome inhibited behavior in animals placed in an anxiety-producing situation.

The anticonvulsant activity of the compounds of the invention is measured in a standard test in which each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

Some results obtained for compounds of the present invention when tested by the foregoing procedure are as follows. X=chlorine, 4+ at 2 to 125 mg./kg. X=hydrogen, 4+ at 4 to 125 mg./kg. X=fluorine, 4+ at 2 to 125 mg./kg.

The antianxiety activity of the compounds of the invention is determined in a test that measures food consumption by rats that have been placed in an anxiety-producing situation. In this test, newly arrived Holtzman male albino rats are allowed to adjust to the laboratory environment for at least 3 days before testing. When tested, the animals are experimentally naive, are under no condition of dietary deprivation, and weigh about 230 grams. After adjustment to the normal laboratory environment, each of a group of 8 rats is given a measured dose of test compound, dissolved in water or suspended in 0.2% aqueous methylcellulose, by oral intubation and is immediately placed in an individual metabolism cage. A 30-minute period is allowed for absorption of the test compound. Each animal is then given access to a milk preparation in a graduated and calibrated tube. The preparation consists of one part sweetened condensed milk and two parts water. The total milk intake of each animal after one and 2 hours is recorded and compared with that of a group of 8 untreated control aniamsl. The animals are also observed for any gross behavioral signs and symptoms. Greater than normal ingestion of milk by the treated animals is regarded as an indication that the test compound, by acting upon the inhibitory brain systems, has suppressed the natural tendency of rodents to become immobilized in a novel, anxiety-producing situation, as represented in the test by the isolation of the metabolism cage. A given dose of test compound is considered active if it causes a mean amount of ingestion greater than 5.0 ml. per animal at the end of the first hour of the test. During this same period, the untreated controls normally consume between 2.0 and 4.0 ml. of milk.

Some activities of compounds of the present invention, as determined by the foregoing procedure, are as follows in which the first value given is the volume of milk ingested by the end of the first hour of the test. X=chlorine, 9.4 ml. at 20 mg./kg.; 10.4 ml. at 10 mg./kg.; 8.3 ml. at 2.5 mg./kg. X=hydrogen, 11.3 ml. at 20 mg./kg.; 6.6 ml. at 10 mg./kg.; 4.9 ml. at 2.5 mg./kg. X=fluorine, 7.0 ml. at 10 mg./kg.; 5.9 ml. at 2.5 mg./kg. The pharmacological agents diazepam and chlordiazepoxide, which are known to be clinically useful for the treatment of anxiety states, are also active in this test procedure. The demonstration of activity for diazepam and chlordiazepoxide indicates the validity of the test procedure for determining antianxiety activity.

The compounds of the invention are preferably administered orally, as indicated above, although parenteral administration can also be used. They can be combined with either a solid or liquid carrier or diluent and made available in varying amounts in such pharmaceutical forms as tablets, capsules, powders, and aqueous and nonaqueous suspensions and solutions.

The invention is illustrated by the following examples.

EXAMPLE 1

A blended mixture of 4.8 g. of 4-(o-chlorophenyl)-1,6-dihydro-1,3-dimethyl - 7 - (methylthio)pyrazolo[3,4-e][1,4]diazepine and 0.8 g. of acetohydrazide is heated rapidly to 160° C. at atmospheric pressure and then held for 4 hours at 185–200° C. under reduced pressure (10 mm. of mercury). The mixture is cooled and extracted with ethanol. The ethanol extract is evaporated under reduced pressure and the residue is dissolved in a minimum amount of acetonitrile. The acetonitrile solution is added to a column of neutral activated alumina and the product is removed from the column by elution with acetonitrile. The acetonitrile eluate is concentrated under reduced pressure to a small volume and diluted with ether to induce crystallization. The insoluble product is collected on a filter; it is 4-(o-chlorophenyl)-1,6-dihydro-1,3,9-trimethylpyrazolo[4,3-f] - s - triazolo[4,3-a]diazepine. For purification it is sublimed at 175–185° C. at 0.1 mm. The purified product has M.P. 236–237° C. A solution of 0.5 g. of this free base in 5 ml. of warm isopropyl alcohol is treated with an excess of a saturated solution of hydrogen chloride in isopropyl alcohol and then allowed to stand at room temperature, diluted with ether to the point of cloudiness, and chilled. The insoluble product is collected on a filter and dried at 50° C. under reduced pressure. It is the monohydrochloride salt; M.P. 170–172° C. A citrate salt is obtained by reacting the free base with citric acid in methanol.

The same free base and salts are obtained by using as starting material 4-(o-chlorophenyl) - 1,6 - dihydro-1,3-dimethylpyrazolo[3,4-e][1,4]diazepine-7-thiol.

EXAMPLE 2

By following the general procedure of Example 1, but using as starting materials 1.42 g. of 1,6-dihydro-1,3-dimethyl-7-(methylthio) - 4 - phenylpyrazolo[3,4-e][1,4]diazepine and 0.4 g. of acetohydrazide, the product obtained is 1,6-dihydro - 1,3,9 - trimethyl-4-phenylpyrazolo[4,3-f]-s-triazolo[4,3-a][1,4]diazepine. Following sublimation of 175–185° C. at 0.1 mm., it has M.P. 319–320° C.

EXAMPLE 3

By following the general procedure of Example 1, but using as starting materials 3.0 g. of 4-(o-fluorophenyl)-1,6 - dihydro-1,3-dimethyl-7-(methylthio)pyrazolo[3,4-e][1,4]-diazepine and 0.65 g. of acetohydrazide, the product obtained is 4-(o-fluorophenyl)-1,6-dihydro-1,3,9-trimethylpyrazolo[4,3-f] - s - triazolo[4,3-a][1,4]diazepine. Following sublimation at 185–190° C. at 0.1 mm., it has M.P. 254–256° C. Tartrate and maleate salts are obtained by reacting the free base with, respectively, tartaric acid and maleic acid.

STARTING MATERIALS

A mixture of 30 g. of phosphorus pentasulfide in 200 ml. of pyridine, 25.4 g. of 6,8-dihydro-1,3-dimethyl-4-phenylpyrazolo[3,4-e][1,4]diazepin-7(1H)-one and 200 ml. of dioxane is stirred and heated at 75° C. fo 20 minutes, then evaporated under reduced pressure. The residue is mixed with 2.5 liters of water and the mixture is stirred at room temperature for 16 hours. The solid 1,6-dihydro 1,3-dimethyl - 4 - phenylpyrazolo[3,4-e][1,4]diazepine-7-thiol which remains is collected by filtration, washed with water, and dried. For purification, a sample is dissolved in a minimum amount of acetonitrile and the solution is added to a column of neutral activated alumina. The column is eluated with 5% methanol in acetonitrile. The eluate is evaporated under reduced pressure to give purified product, M.P. 268–269° C.

A total of 20 g. of phosphorus pentasulfide is added in two portions of a solution of 15 g. of 4-(o-chlorophenyl)-6,8-dihydro - 1,3 - dimethylpyrazolo[3,4-e][1,4]-diazepin-7(1H)-one in 250 ml. of pyridine. The mixture is stirred and heated at 80° C. for 2 hours, then evaporated under reduced pressure. The residue is mixed with 2 liters of water and the mixture is stirred at room temperature for 16 hours. The solid 4-(o-chloophenyl)-1,6-dihydro-1,3 - dimethylpyrazolo[3,4-e][1,4]diazepine - 7 - thiol which remains is collected by filtration, washed with water, and dried. For purification, a sample is dissolved in a minimum amount of acetonitrile and the solution is added to a column of neutral actvated alumina. The column is eluted with 5% methanol in acetonitrile. The eluate is evaporated under reduced pressure to give purified product, M.P. 243–245° C.

With stirring, 27.2 g. of 4-(o-fluorophenyl)-6,8-dihydro-1,3-dimethylpyrazolo[3,4-e][1,4]diazepin - 7(1H) - one in 200 ml. of dioxane is added to a mixture of 30 g. of phosphorus pentasulfide in 200 ml. of pyridine. The mixture is heated at 65° C. for 80 minutes, then evaporated under reduced pressure. The residue is mixed with 2 liters of water and the mixture is stirred at room temperature for 16 hours. The solid 4-(o-fluorophenyl)-1,6-dihydro-1,3 - dimethylpyrazolo[3,4-e][1,4]diazepine - 7 - thiol which remains is collected by filtration, washed with water, and dried. For purification, a sample is dissolved in a minimum amount of acetonitrile and the solution is added to a column of neutral activated alumina. The column is eluted with 5% methanol in acetonitrile. The eluate is evaporated under reduced pressure to give purified product, M.P. 243–245° C.

With stirring under a nitrogen atmosphere, 14.4 g. of a 56.6% sodium hydride dispersion in mineral oil is added to a solution of 76.75 g. of 4-(o-fluorophenyl)-1,6-dihydro-1,3-dimethylpyrazolo[3,4-e][1,4]diazepine-7-thiol in 280 ml. of dimethyl sulfoxide, cooled to 20° C. After 5 more minutes at room temperature, 50 g. of iodomethane is added and stirring at room temperature is continued for an additional 30 minutes. The mixture is then heated to 50° C., stirred at that temperature for 2 hours, and then cooled and poured into 3 liters of water. The resulting mixture is extracted with three one-liter portions of ether. The combined ether extract is washed with water, dried, and filtered through neutral activated alumina. The filtrate is evaporated to a small volume and chilled to induce crystallization. The product is collected on a filter. It is 4-(o-fluorophenyl)-1,6-dihydro-1,3-dimethyl-7 - (methylthio)-pyrazolo[3,4-e][1,4]diazepine; M.P. 110–112° C. By the same general procedure, using the indicated quantities of starting materials, the following additional products are obtained.

From 58 g. of 4-(o-chlorophenyl)-1,6-dihydro-1,3-dimethylpyrazolo[3,4-e][1,4]diazepine-7-thiol in 250 ml. of dimethyl sulfoxide, 10 g. of a 56.6% dispersion of sodium hydride in mineral oil, and 35 g. of iodomethane, the product is 4-(o-chlorophenyl)-1,6-dihydro-1,3 - dimethyl - 7-(methylthio)pyrazolo[3,4-e][1,4]diazepine as an oil, suitable for use without further purification.

From 44 g. of 1,6-dihydro-1,3-dimethyl-4-phenylpyrazolo[3,4-e][1,4]diazepine-7-thiol in 250 ml. of dimethyl sulfoxide, 8.4 g. of a 56.6% dispersion of sodium hydride in mineral oil, and 28.4 g. of iodomethane, the product is 1,6-dihydro-1,3-dimethyl-7-(methylthio) - 4 - phenylpyrazolo[3,4-e][1,4]diazepine; M.P. 117–118° C.

What is claimed is:
1. A member of the class consisting of compounds of the formula

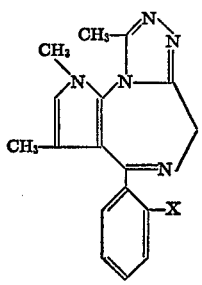

and acid-addition salts thereof; where X is a member of the class consisting of hydrogen, fluorine, and chlorine.

2. A compound according to claim 1 which is 4-(o-chlorophenyl)-1,6-dihydro-1,3,9 - trimethylpyrazolo[4,3-f]-s-triazolo[4,3-a][1,4]diazepine.

3. A compound according to claim 1 which is an acid-addition salt of 4-(o-chlorophenyl)-1,6-dihydro-1,3,9-trimethylpyrazolo[4,3-f]-s-triazolo[4,3-a][1,4]diazepine.

4. A compound according to claim 3 which is 4-(o-chlorophenyl)-1,6-dihydro-1,3,9 - trimethylpyrazolo[4,3-f]-s-triazolo[4,3-a][1,4]diazepine monohydrochloride.

5. A compound according to claim 1 which is 1,6-dihydro-1,3,9-trimethyl-4-phenylpyrazolo[4,3-f]-s - triazolo[4,3-a][1,4]diazepine.

6. A compound according to claim 1 which is 4-(o-fluorophenyl)-1,6-dihydro - 1,3,9 - trimethylpyrazolo[4,3-f]-s-triazolo[4,3-a][1,4]diazepine.

6. A compound according to claim 1 which is 4-(o-fluorophenyl)-1,6-dihydro - 1,3,9 - trimethylpyrazolo[4,3-f][-s-triazolo[4,3-a][1,4]diazepine.

7. Process for the production of compounds as defined in claim 1 which comprises reacting a thio-substituted diazepine compound of the formula

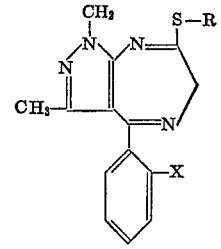

or a salt thereof with acetohydrazide or a salt thereof, and isolating the product as the free base or as a salt; where X is as defined in claim 1 and R is a member of the class consisting of hydrogen and lower alkyl.

8. Process according to claim 7 wherein R is methyl and the reaction is carried out by heating the reactants in the absence of a solvent at 150–250° C.

References Cited
UNITED STATES PATENTS

| | | | |
|---|---|---|---|
| 3,709,899 | 1/1973 | Hester | 260—308 R |
| 3,734,922 | 5/1973 | Hester | 260—308 R |
| 3,657,271 | 4/1972 | Swett | 260—308 R |
| 3,558,605 | 1/1971 | De Wald et al. | 260—239.3 |

ALTON D. ROLLINS, Primary Examiner

U.S. Cl. XR.

260—310 R; 424—273